May 20, 1941.　　　A. B. NEWTON　　　2,242,728
CONTROL SYSTEM FOR REFRIGERATING APPARATUS
Filed March 17, 1938　　　3 Sheets-Sheet 1

Inventor
Alwin B. Newton
By George H. Fisher
Attorney

May 20, 1941. A. B. NEWTON 2,242,728
CONTROL SYSTEM FOR REFRIGERATING APPARATUS
Filed March 17, 1938 3 Sheets-Sheet 3

Inventor
Alwin B. Newton
By George H Fisher
Attorney

Patented May 20, 1941

2,242,728

UNITED STATES PATENT OFFICE 2,242,728

CONTROL SYSTEM FOR REFRIGERATING APPARATUS

Alwin B. Newton, Minneapolis, Minn., assignor to Minneapolis-Honeywell Regulator Company, Minneapolis, Minn., a corporation of Delaware Application March 17, 1938, Serial No. 196,452

14 Claims. (Cl. 62—4)

This invention relates to control systems for a refrigerating apparatus and more particularly for a refrigerating apparatus having associated therewith auxiliary equipment such as a circulating means for circulating the fluid to be cooled over the evaporator of the refrigerating apparatus.

The prime object of this invention is to provide a control system for such an arrangement wherein the operation of the compressor and the circulating means are correlated to give efficient and economical operation.

In carrying out this invention, control means are provided for the compressor and control means are provided for the circulating means along with a single condition responsive device for operating both control means in a correlated manner. An adjusting means is also provided for adjusting both control means simultaneously so that the relation between the control means remains the same regardless of the adjustment. The particular manner of operation and details of construction utilized for this purpose also form objects of this invention.

The control system of this invention has varied uses or applications and the use or application of this control system for controlling fixtures such as walk-in boxes, soda fountains, and the like and for controlling unit conditions for air conditioning purposes also form objects of this invention.

Other objects and advantages will become apparent to those skilled in the art upon reference to the accompanying specification, claims, and drawings, in which:

Figures 1, 2:
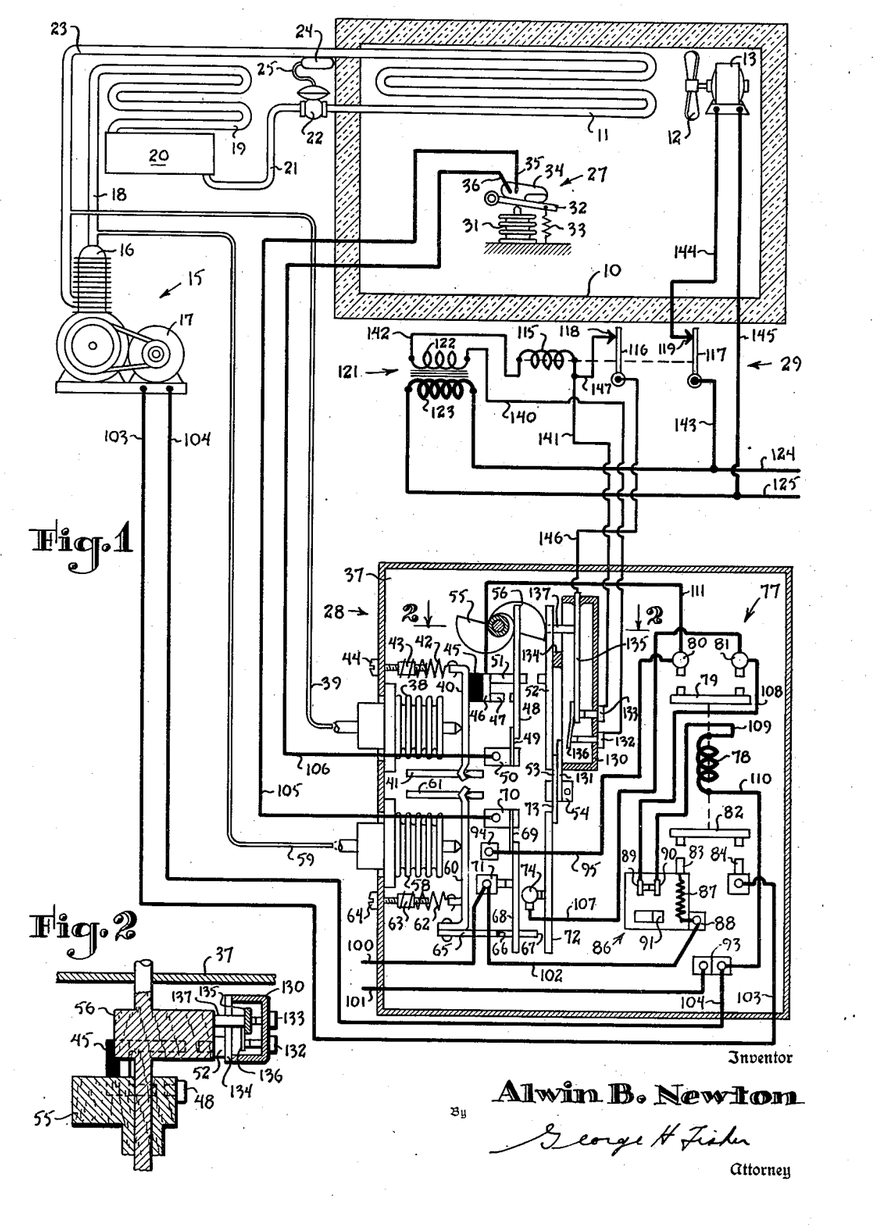
Figure 1 is a diagrammatic illustration of one form of this invention as applied to a fixture such as a walk-in box provided with a circulating or defrosting fan.
Figure 2 is a sectional view of a portion of the control arrangement of Figure 1 taken substantially on the line 2—2 of Figure 1.

Referring now to Figure 1, 10 designates a fixture such as a storage compartment or walk-in box in which it is desired to maintain predetermined temperature and humidity conditions. The fixture 10 is cooled by an evaporator 11 and an air circulating and defrosting fan 12. The defrosting fan 12 may be operated by an electric motor 13 to circulate air over the evaporator 11 to cool the fixture 10 and to retard frosting of the evaporator.

Refrigerant is supplied to and withdrawn from the evaporator 11 by a refrigerating apparatus generally designated at 15 which may comprise a compressor 16 operated by a motor 17, a high pressure line 18, a condenser 19, and a receiver 20. Liquid refrigerant passes from the receiver 20 through a liquid line 21 and an expansion valve 22 to the evaporator 11 and expanded refrigerant is withdrawn from the evaporator 11 to a low pressure or suction line 23 by the compressor 16. The expansion valve 22 may be of the thermostatic expansion type and may comprise a bulb 24 containing a volatile fluid and located at the discharge of the evaporator. The bulb 24 is connected by a capillary tube 25 to the expansion valve 22. Since such a refrigerating apparatus is conventional in the art a further description thereof is not considered necessary.

The refrigerating apparatus 15 is controlled by a thermostatic control means generally designated at 27 responsive to the temperature within the fixture and by a unitary control arrangement generally designated at 28. The defrosting fan 12 is controlled by a relay generally designated at 29 which in turn is controlled by the unitary control arrangement 28.

The thermostatic control means 27 may comprise a bellows 31 containing a volatile fluid for operating a lever 32 against the action of a tension spring 33. The lever 32 operates a mercury switch 34 having electrodes 35 and 36. For purposes of illustration, it is assumed that when the temperature of the fixture rises to 40° the mercury switch 34 is tilted to a position to bridge the electrodes 35 and 36, and when the temperature of the fixture decreases to 38° the mercury switch 34 is tilted to the position shown in Figure 1 to unbridge the electrodes 35 and 36. By adjusting the tension in the spring 33, the temperature setting of the thermostatic control means 27 may be varied at will.

The unitary control arrangement 28 may be of the type shown and described in application Serial No. 196,447 filed by Albert L. Judson and Carl G. Kronmiller on March 17, 1938. For purposes of illustration in this application, this unitary control arrangement is shown to comprise a base 37 upon which is mounted a bellows 38 connected by a pipe 39 to the low pressure or suction line 23 of the refrigerating apparatus. The bellows 38 operates a lever 40 pivoted on a fulcrum member 41 against the action of a spring 42. One end of the spring 42 is connected to the lever 40 and the other end is connected to a nut 43 screw-threadedly mounted on a screw 44. By rotating the screw 44 the pressure setting of the bellows may be varied at will. The lever 40 carries an insulating pad 45 upon which is mounted a bridge member 46. The bridge member 46 carries a contact 47 which is adapted to engage a contact member 48 carried through a leaf spring 49 by a terminal 50. The bridge member 46 also carries a contact 51 adapted to engage a contact member 52 carried through a leaf spring 53 by a terminal 54. The leaf springs 49 and 53 maintain the contact members 48 and 52 in engagement with cams 55 and 56 having a common axis of rotation. By rotating the cam 55 the position of the contact member 48 with respect to the contact 47 may be adjusted and likewise by rotating the cam 56 the position of the contact member 52 with respect to the contact 51 may be adjusted. Accordingly, independent adjustment of the contact members 48 and 52 is provided. For purposes of illustration, it is assumed that cams 55 and 56 are so adjusted that when the suction pressure rises to 20 pounds the contact 47 is moved into engagement with the contact member 48, and when the suction pressure rises to 40 pounds the contact 51 is moved into engagement with the contact member 52. Upon a decrease in pressure to 40 pounds the contact 51 is moved out of engagement with the contact member 52 and when the suction pressure decreases to 20 pounds the contact 47 is moved out of engagement with the contact member 48.

Also carried by the base 37 is a bellows 58 which is connected by a pipe 59 to the high pressure line 18 of the refrigerating apparatus. The bellows 58 operates a lever 60 pivoted on a fulcrum member 61 against the action of a tension spring 62. One end of the tension spring 62 is connected to the lever 60 and the other end is connected to a nut 63 screw-threadedly mounted on a screw 64. By rotating the screw 64 the tension in the spring 62 is varied and hence the pressure setting of the bellows 58 may be adjusted at will. The lever 60 carries an adjustable abutment member 65 having abutments 66 and 67. The abutment 66 is adapted to engage a contact member 68 carried through a leaf spring 69 by a terminal 70. The contact member 68 engages and disengages a contact 71. The abutment 67 engages a contact member 72 carried through a leaf spring 73 by the terminal 54. The contact member 72 engages and disengages a contact 74. For purposes of illustration, it is assumed that upon an increase in high pressure the contact member 72 is moved out of engagement with the contact 74 at 135 pounds and the contact member 68 is moved out of engagement with the contact 71 at 185 pounds. Likewise, upon a decrease in pressure on the high pressure side of the refrigerating apparatus, the contact member 68 engages the contact 71 at 185 pounds and the contact member 72 engages the contact 74 at 135 pounds.

The unitary control arrangement also includes a starter or relay generally designated at 77. This starter or relay may comprise an operating coil 78 for operating a bridge member 79 with respect to contacts 80 and 81 and a bridge member 82 with respect to contacts 83 and 84. When the operating coil 78 is energized, the bridge member 79 engages the contacts 80 and 81 and the bridge member 82 engages the contacts 83 and 84. When the operating coil 78 is deenergized the bridge members are moved out of engagement with their respective contacts by means of springs, gravity, or other means, not shown.

The unitary control arrangement may also include an overload cut-out mechanism generally designated at 86. This overload cut-out mechanism may comprise a heater element 87 connected between a terminal 88 and the contact 83 for heating a thermostatic element upon the occurrence of an overload condition to trip apart contacts 89 and 90. The contacts 89 and 90 may be manually reengaged by means of a reset lever 91.

The unitary control arrangement may also include a power terminal 93 and a control terminal 94 connected by a conductor 95 to the contact 80 of the relay or starter 77. The terminal 94 is not utilized in Figures 1 and 3 but it is utilized in Figure 5. Power is supplied to the unitary control arrangement by means of line wires 100 and 101 leading from some source of power, not shown. Line wire 100 connects to contact 71 and line wire 101 connects to power terminal 93. The contact 71 is connected by a conductor 102 to the terminal 88 of the overload cut-out 86. The contact 84 of the starter or relay is connected by a wire 103 to the compressor motor 17 and the compressor motor 17 is also connected by a wire 104 to the power terminal 93. The electrodes 35 and 36 of the thermostatic control means 27 are connected across terminals 70 and 50 by means of wires 105 and 106. Contact 74 is connected by a conductor 107 to contact 81 of the starter or relay. The contact 81 is in turn connected by a conductor 108 to the contact 89 of the overload cut-out and the contact 90 is connected by a conductor 109 to the operating coil 78. The operating coil 78 is connected by a conductor 110 to the power terminal 93. The bridge member 46 is connected by a conductor 111 to the contact 80 of the relay or starter 77.

Assume the parts thus far described in the positions shown in Figure 1. The fixture temperature is below 40°, the suction pressure is below 20 pounds, and the high pressure is less than 135 pounds. When the suction pressure rises to 40 pounds to cause the contacts 47 and 51 to engage the contact members 48 and 52, and when the fixture temperature rises to 40° a starting circuit for the relay or starter 77 is completed from the line wire 100 through contact 71, contact member 68, terminal 70, wire 105, electrodes 35 and 36, wire 106, terminal 50, contact member 48, contact 47, bridge member 46, contact 51, contact member 52, terminal 54, contact member 72, contact 74, conductor 107, contact 81, conductor 108, contacts 89 and 90, conductor 109, operating coil 78, conductor 110 and power terminal 93 back to the other line wire 101. Completion of this circuit energizes the operating coil 78 to move the bridge member 79 into engagement with its contacts 80 and 81 and the bridge member 82 into engagement with its contacts 83 and 84.

Movement of the bridge member into engagement with its contacts 83 and 84 completes a load circuit for the compressor motor 17 which may be traced from the line wire 100 through contact 71, conductor 102, terminal 88, heater element 87, contact 83, bridge member 82, contact 84, wire 103, compressor motor 17, wire 104, and power terminal 93 back to the other line wire 101. Accordingly, when the relay or starter 77 is pulled in the compressor motor 17 is placed in operation.

Movement of the bridge member 79 into engagement with the contacts 80 and 81 completes a maintaining circuit for the relay or starter 77 which is independent of the contact members 52 and 72. This maintaining circuit may be traced from the line wire 100 through contact 71, contact member 68, terminal 70, wire 105, electrodes 35 and 36, wire 106, terminal 50, contact member 48, contact 47, bridge member 46, conductor 111, contact 80, bridge member 79, contact 81, conductor 108, contacts 89 and 90, conductor 109, operating coil 78, conductor 110, and power terminal 93 back to the other line wire 101. Thus the refrigerating apparatus is maintained in operation until either the fixture temperature decreases to 38° or the suction pressure decreases to 20 pounds, or the high pressure increases to 185 pounds. After the refrigerating apparatus has been stopped upon the occurrence of any of these contingencies it cannot again be restarted until the fixture temperature rises to 40°, the suction pressure rises to 40 pounds and the high pressure decreases to 135 pounds. If the value of the suction pressure illustrated as 40 pounds which determines the starting of the refrigerating apparatus is above the defrosting temperature of the evaporator 11, the evaporator 11 is defrosted every time that the refrigerating apparatus is shut down. Thus the accumulation of frost on the evaporator with a consequent decrease in relative humidity in the fixture 10 is prevented. Since the overload cut-out 86 is located in both the starting and maintaining circuits for the relay or starter 77, the relay or starter 77 is dropped out upon the occurrence of an overload condition and cannot be restarted until the conditions outlined above occur.

The relay 29 which controls the operation of the defrosting fan 12 may comprise a relay coil 115 for operating switch arms 116 and 117 with respect to contacts 118 and 119. The arrangement is such that when the relay coil 115 is energized the switch arms 116 and 117 are moved into engagement with the contacts 118 and 119, and when the relay coil is deenergized the switch arms 116 and 117 are moved out of engagement with their respective contacts by means of springs, gravity, or other means, not shown. Power is supplied to the relay 29 by means of a step-down transformer 121 having a secondary 122 and a primary 123 connected across line wires 124 and 125.

The auxiliary control means which controls the operation of the relay 29 may comprise a box 130 preferably made of insulating material. The box 130 is carried by a leaf spring 131 which in turn is carried by the terminal 54. The box 130 is provided with contacts 132 and 133. A cross member 134 formed on the box 130 rests against the contact member 52 and is held in engagement with the contact member 52 by means of the leaf spring 131. Accordingly, the box 130 moves simultaneously with the contact member 52. Mounted in the box 130 is a resilient contact arm 135 which is adapted to engage the contact 133. The contact member 135 is provided with a resilient contact member 136 which is adapted to engage the contact 132. The parts are so arranged that the resilient contact member 136 engages the contact 132 before the contact member 135 engages the contact 133 and likewise the contact member 135 disengages the contact 133 before the resilient contact member 136 disengages the contact 132. The contact member 135 is provided with a pin 137 which engages the cam surface of the adjusting cam 56. When the contact arm 52 is engaging the cam 56, the contact members 135 and 136 are engaging their respective contacts 133 and 132. When the pressure on the low pressure side of the refrigerating apparatus rises above 40 pounds to move the contact member 52 away from the cam 56, the box 130 is also moved and the contact 133 first disengages the contact member 135 and the contact 132 then disengages the contact member 136. For purposes of illustration, it is assumed that the contact 133 and the contact member 135 separate at 40½ pounds and that the contact 132 and the contact member 136 separate at 41 pounds. Upon a decrease in pressure on the low pressure side of the refrigerating apparatus, the contact 132 engages the contact member 136 at 41 pounds and the contact 133 engages the contact member 135 at 40½ pounds.

When the contact 133 and contact member 135 engage and the contact 132 and the contact member 136 engage, a starting circuit for the relay 29 is completed which may be traced from the secondary 122 through wire 140, contact 132, contact members 136 and 135, contact 133, wire 141, relay coil 115, and wire 142 back to the secondary 122. Completion of this circuit energizes the relay coil 115 to move the switch arms 116 and 117 into engagement with their respective contacts 118 and 119. Movement of the switch arm 117 into engagement with the contact 119 completes a circuit from the line wire 124 through wire 143, switch arm 117, contact 119, wire 144, defrosting fan motor 13, and wire 145 back to the other line wire 125. Completion of this circuit causes operation of the defrosting fan 12. Movement of the switch arm 116 into engagement with the contact 118 completes a maintaining circuit for the relay coil 115 which is independent of the contact 133. This maintaining circuit may be traced from the secondary 122 through wire 140, contact 132, contact members 136 and 135, wire 146, switch arm 116, contact 118, wire 147, relay coil 115, and wire 142 back to the secondary 122.

Accordingly, when the suction pressure decreases to 40½ pounds, the defrosting fan 12 is placed in operation and remains in operation until such time as the suction pressure rises to 41 pounds. It follows then that if the refrigerating apparatus is shut down for a relatively long period by reason of the thermostatic control means 27 being satisfied, by reason of the existence of an extremely high pressure condition on the high pressure side of the refrigerating apparatus, by reason of an overload condition in the compressor motor circuit or for any other reason, the cooling will be terminated with a consequent increase in temperature of the evaporator also resulting in an increase in suction pressure. Under these conditions when the suction pressure and coil temperature have assumed high values, it would not be desirable to operate the defrosting fan 12 which would circulate relatively warm air throughout the fixture 10. Accordingly, with this invention the defrosting fan 12 is normally in continuous operation but is stopped before the evaporator temperature rises to too high a value. The cam 56 which adjusts the cut-in point of the suction pressure control simultaneously adjusts the auxiliary control means so that the auxiliary control means stops the defrosting fan whenever the suction pressure rises 1 pound, illustratively, above the cut-in point setting of the refrigerating apparatus. This is an extremely desirable feature inasmuch as the defrosting fan is so controlled that it will not circulate air through the fixture whenever the evaporator temperature rises above the cut-in point regardless of the desired evaporator temperature.

Figures 3, 4:
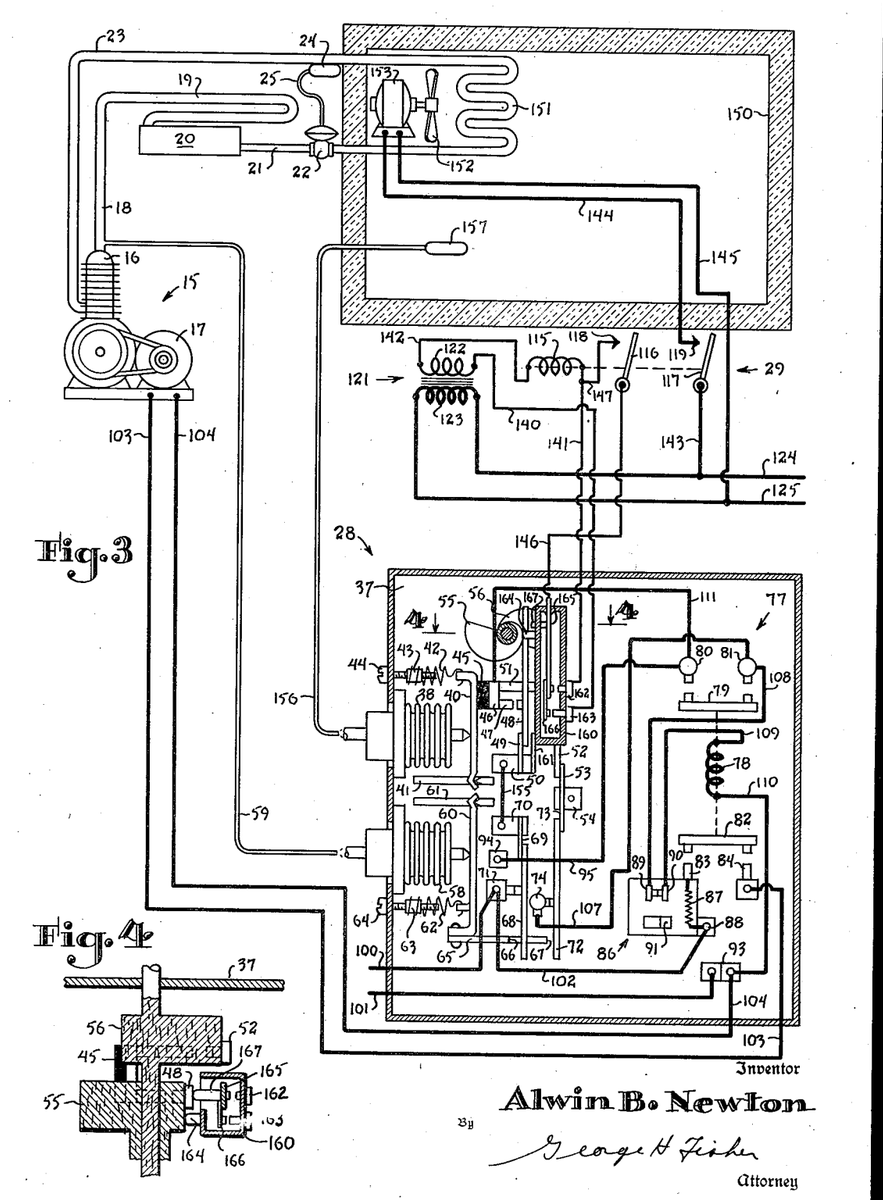
Figure 3 is a diagrammatic illustration of another form of this invention as applied to unit cooling arrangements for cooling a space wherein the unit cooling arrangement comprises a cooling coil and an air circulating fan.
Figure 4 is a detailed view taken substantially along the line 4—4 of Figure 3.

Referring now to Figure 3, the control arrangement of this invention is applied to a refrigerating system utilized for air conditioning purposes such as cooling a room or space 150. Located in the room or space is a unit cooler for conditioning the space which may comprise a cooling coil in the form of an evaporator 151 with a fan or blower 152 for circulating the air over the cooling coil. The fan 152 may be operated by an electric motor 153.

The refrigerating apparatus is controlled by the unitary control arrangement 28 which is substantially the same as the unitary control arrangement 28 of Figure 1 with the exception that the bellows 38 instead of being operated in response to variations in suction pressure, it is in this modification operated in accordance with variations in room temperature. Accordingly, the bellows 38 is connected by a capillary tube 156 to a bulb 157 located in the room. The bulb 157 preferably contains a volatile fluid so that the bellows 38 is operated in accordance with variations in space temperature. For purposes of illustration, it is assumed that upon an increase in space temperature contact 47 engages contact member 48 at 78° and contact 51 engages contact member 52 at 80°. Upon a decrease in room temperature, contact 51 disengages contact member 52 at 80° and contact 47 disengages contact member 48 at 78°. In this modification an independent thermostatic control means is not utilized, and accordingly the terminals 70 and 50 are connected together by a conductor 155.

Assume the parts in the position shown in Figure 3, when the space temperature rises to 80° to move contacts 51 and 47 into engagement with their respective contact members 52 and 48, and when the high pressure has decreased to 135 pounds to cause contact members 68 and 72 to engage their respective contacts 71 and 74, a starting circuit for the relay or starter 77 is completed to pull in the starter or relay. This starting circuit may be traced from the line wire 100 through contact 71, contact member 68, terminal 70, conductor 155, terminal 50, contact member 48, contact 47, bridge member 46, contact 51, contact member 52, terminal 54, contact member 72, contact 74, conductor 107, contact 81, conductor 108, contacts 89 and 90, conductor 109, operating coil 78, conductor 110, and power terminal 93 back to the other line wire 101. When the relay or starter 77 is pulled in by this starting circuit, the compressor 16 of the refrigerating apparatus is placed in operation in the manner pointed out above. The pulling in of the relay or starter 77 completes a maintaining circuit therefor which is independent of the contact members 52 and 72 and this maintaining circuit may be traced from the line wire 100 through contact 71 contact member 68, terminal 70, conductor 155, terminal 50, contact member 48, contact 47, bridge member 46, conductor 111, contact 80, bridge member 79, contact 81, conductor 108, contacts 89 and 90, conductor 109, operating coil 78, conductor 110, and power terminal 93 back to the other line wire 101. The refrigerating apparatus will then remain in operation until either the room temperature decreases to 78° or until the high pressure rises to 185 pounds. When the compressor is shut down upon the occurrence of either of these two contingencies, it cannot again be placed in operation until the space temperature rises to 80° and until the high pressure decreases to 135 pounds. From the above it is seen that the refrigerating apparatus is controlled to maintain desired room temperatures, that is, temperatures between 78° and 80°.

The fan motor 153 is controlled by the relay 29 in the same manner as pointed out above in connection with Figure 1 and therefore like reference characters have been utilized. The relay 29 is in turn controlled by a slightly different auxiliary control means, and this auxiliary control means is shown in detail in Figures 3 and 4. This auxiliary control means comprises a box 160 preferably made of insulating material carried through a leaf spring 161 by the terminal 50. The box 160 is provided with contacts 162 and 163. The box 160 is also provided with a pin 164 which engages the surface of the cam 55. Mounted in the box 160 is a resilient contact arm 165 which is adapted to engage contact 162. This contact arm 165 carries a resilient contact arm 166 which is adapted to engage contact 163. The contact arm 165 carries a pin 167 which engages the contact member 48. The leaf spring 161 holds the pin 164 in engagement with the cam 55. Upon an increase in space temperature the contact 47 engages the contact member 48, and upon a further increase in space temperature the contact member 48 operates the pin 167 to move the contact arm 166 into engagement with contact 163 and then to move contact arm 165 into engagement with contact 162. For purposes of illustration, it is assumed that the contact arm 166 is moved into engagement with the contact 163 at 78° and that the contact arm 165 is moved into engagement with the contact 162 at 80°. Accordingly, when the space temperature rises to 80°, contact 162 and contact arm 165 will engage and contact 163 and contact arm 166 will engage to complete a starting circuit for the relay 29 which may be traced from the secondary 122 through wire 140, contact 163, contact arms 166 and 165, contact 162, wire 141, relay coil 115, and wire 142 back to the secondary 122. This starting circuit pulls in the relay 29 to cause operation of the air circulating fan 152. Pulling in of the relay 29 also completes a maintaining circuit therefor which may be traced from the secondary 122 through wire 140, contact 163, contact arms 166 and 165, wire 146, switch arm 116, contact 118, wire 147, relay coil 115, and wire 142 back to the secondary 122. Completion of this circuit maintains the relay 29 pulled in until such time as the space temperature decreases to 78° to move the contact arm 166 out of engagement with the contact 163.

By reason of the control arrangement of this modification, the refrigerating apparatus and the air circulating fan are both placed in operation when the space temperature rises to 80° and are both continued in operation until such time as the space temperature decreases to 78°. In other words, the air circulating fan and the refrigerating apparatus are started and stopped substantially simultaneously by the same control arrangement. When the cam 55 is adjusted to vary the temperature value at which the refrigerating apparatus is placed in operation, it likewise adjusts similarly and simultaneously the temperature value at which the air circulating fan 152 is placed in operation. In other words, by a single adjustment the temperature values at which the refrigerating apparatus and the air circulating fan are operated are adjusted simultaneously and in like amounts.

Figures 5, 6:
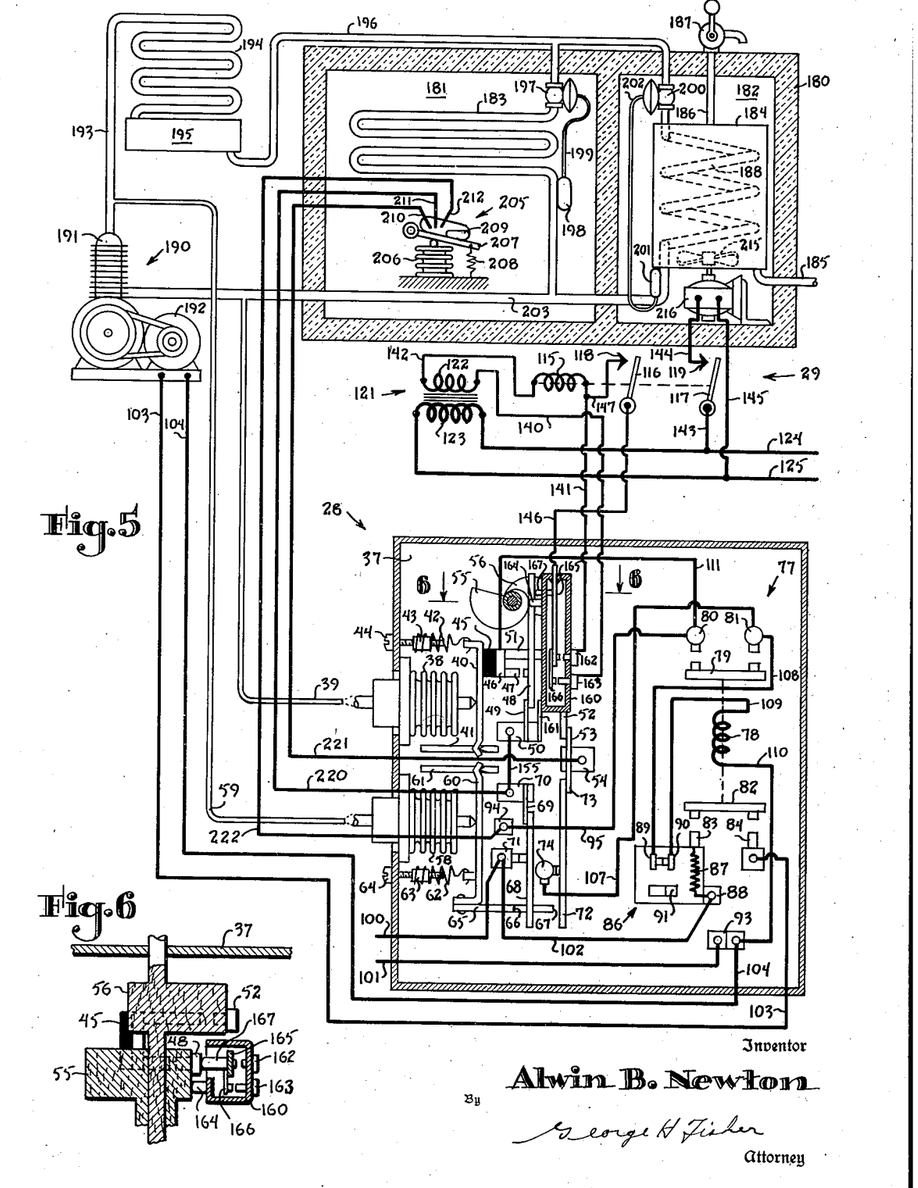
Figure 5 is a diagrammatic illustration of another form of this invention as applied to a fixture of the soda fountain type provided with a storage chamber and a water or beverage cooler.
Figure 6 is a detailed view taken substantially along line 6—6 of Figure 5.

Referring now to Figures 5 and 6, the control arrangement is shown as applied to a refrigerating apparatus for maintaining desired conditions in a fixture such as a soda fountain 180. The soda fountain is provided with a storage chamber 181 and is also provided with a water or beverage cooler chamber 182. Desired temperatures are maintained in the storage chamber 181 by an evaporator 183. A water tank 184 located in the cooler chamber 182 is supplied with water through an inlet pipe 185 and the cooled water may be discharged from the tank 184 through a discharge pipe 186 and a dispensing valve 187. Located in the tank 184 is an evaporator 188 for cooling the water in the tank. A circulator 215 is provided for circulating the water in the tank 184 about the evaporator 188 and this circulator 215 may be operated by an electric motor 216.

Refrigerant is supplied to and withdrawn from the evaporators 183 and 188 by a refrigerating apparatus generally designated at 190. This refrigerating apparatus may comprise a compressor 191 operated by a motor 192, a high pressure line 193, a condenser 194, and a receiver 195. Liquid refrigerant passes from the receiver 195 through a liquid line 196 and an expansion valve 197 to the evaporator 183. The expansion valve 197 may be a thermostatic expansion valve having a bulb 198 containing a volatile fluid and located on the discharge side of the evaporator and connected to the valve 197 by a capillary tube 199. Liquid refrigerant is supplied from the liquid line 196 through an expansion valve 200 to the evaporator 188 and the expansion valve 200 may likewise be a thermostatic expansion valve having a bulb 201 adjacent the discharge of the evaporator 188 and connected to the valve 200 by a capillary tube 202. Expanded refrigerant is withdrawn from the evaporators 183 and 188 through a low pressure or suction line 203 by the compressor 191.

The refrigerating apparatus is controlled by a unitary control arrangement 28 which is the same as that disclosed in Figures 1 and 3 and by a thermostatic control means generally designated at 205 responsive to the temperature in the storage compartment 181. The circulator is controlled by the relay 29 which in turn is controlled by the auxiliary control means in the unitary control arrangement 28.

In this modification, the bellows 38 which operates the contacts 47 and 51 is connected by a pipe 39 to the suction line of the refrigerating apparatus so that these contacts are operated in accordance with variations in suction pressure. The conductor 155 between the terminals 70 and 50 is also utilized in this modification.

The thermostatic control means 205 may comprise a bellows 206 containing a volatile fluid for operating a lever 207 against the action of a tension spring 208. The lever 207 operates a mercury switch 209 containing electrodes 210, 211, and 212. For purposes of illustration, it is assumed that when the temperature of the storage compartment 181 rises to 40°, the mercury switch 209 is tilted to a position to cause the electrodes 210, 211, and 212 to be bridged. When the temperature decreases to 38° the mercury switch 209 is tilted to the position shown in Figure 5 to unbridge the electrodes 210, 211, and 212. By adjusting the tension in the spring 208, the temperature setting of the thermostatic control means 205 may be varied at will. The terminal 70 is connected by a wire 220 to the electrode 211, the terminal 54 by a wire 221 to the electrode 210, and the terminal 94 by a wire 222 to the electrode 212.

For purposes of illustration, it is assumed that the unitary control arrangement 28 is so adjusted that upon an increase in suction pressure contact 47 engages contact member 48 at 20 pounds and contact 51 engages contact member 52 at 30 pounds. Likewise, upon a decrease in suction pressure contact 51 disengages contact member 52 at 30 pounds, and contact 47 disengages contact member 48 at 20 pounds. As in the previous modification, it is assumed that contact 71 and contact member 68 engage and disengage at 185 pounds and contact member 72 and contact 74 engage and disengage at 135 pounds.

With the parts in the position shown in Figure 5, the temperature of the storage compartment 181 is below 40°, the suction pressure is below 20 pounds, and the high pressure is below 135 pounds, the relay or starter 77 is dropped out and the refrigerating apparatus is not operating. When the suction pressure rises to 30 pounds a starting circuit for the relay or starter 77 is completed from line wire 100 through contact 71, contact member 68, terminal 70, conductor 155, terminal 50, contact member 48, contact 47, bridge member 46, contact 51, contact member 52, terminal 54, contact member 72, contact 74, conductor 107, contact 81, conductor 108, contacts 89 and 90, conductor 109, operating coil 78, conductor 110, and power terminal 93 back to the other line wire 101. Completion of this circuit pulls in the relay or starter 77 to place the refrigerating apparatus in operation and also to complete a maintaining circuit for the relay or starter 77 which is independent of the contact members 52 and 72. This maintaining circuit may be traced from the line wire 100, through contact 71, contact member 68, terminal 70, conductor 155, terminal 50, contact member 48, contact 47, bridge member 46, conductor 111, contact 80, bridge member 79, contact 81, conductor 108, contacts 89 and 90, conductor 109, operating coil 78, conductor 110, and power terminal 93 back to the other line wire 101. This maintaining circuit maintains the refrigerating apparatus in operation until such time as the suction pressure decreases to 20 pounds or until the high pressure increases to 185 pounds. By reason of this arrangement, the refrigerating apparatus is placed in operation when the suction pressure increases to 30 pounds and is maintained in operation until the suction pressure decreases to 20 pounds. In this manner the suction pressure is maintained between 20 and 30 pounds, which maintains the temperature of the evaporator 188 in the cooling water at a temperature sufficiently low to cool an appreciable amount the water in the tank 184. Accordingly, a supply of cold water is at all times maintained.

Assume now that the temperature in the storage compartment 181 rises to 40° and that the high pressure is below 135 pounds. Under these conditions, a starting circuit for the relay or starter 77 is completed which may be traced from the line wire 100 through contact 71, contact member 68, terminal 70, wire 220, electrode 211, electrode 210, wire 221, terminal 54, contact member 72, contact 74, conductor 107, contact 81, conductor 108, contacts 89 and 90, conductor 109, operating coil 78, conductor 110, and power terminal 93 back to the other line wire 101. Completion of this starting circuit energizes the starter or relay 77 to place the refrigerating apparatus in operation and to complete a maintaining circuit for the relay or starter which is independent of the contact member 72. This maintaining circuit may be traced from the line wire 100, through contact 71, contact member 68, terminal 70, conductor 220, electrodes 211 and 212, wire 222, terminal 94, conductor 95, contact 80, bridge member 79, contact 81, conductor 108, contacts 89 and 90, conductor 109, operating coil 78, conductor 110, and power terminal 93 back to the other line wire 101. Completion of this maintaining circuit maintains the relay or starter 77 energized and hence the refrigerating apparatus in operation until such time as the temperature of the storage compartment 181 decreases to 38° or the high pressure increases to 185 pounds. In this manner, the refrigerating apparatus is operated to maintain the temperature within the storage compartment between fixed limits of 38° and 40°.

It is here pointed out that after the relay or starter 77 has been pulled in as a result of a call for cooling by the thermostatic control means 205, the maintaining circuit for this relay or starter passing through the contact member 48 and the contact 47 may be completed providing the suction pressure is above 20 pounds. It follows then that every time that the refrigerating apparatus is placed in operation whether it be by the thermostatic control means 205 responsive to the temperature of the storage compartment 181 or by the suction pressure controller, the refrigerating apparatus is maintained in operation until the suction pressure decreases to 20 pounds regardless of whether the thermostatic control means 205 has been satisfied in the meantime. This greatly increases the efficiency of operation of the system.

When the cold water is drawn from the tank 184 through the dispensing valve 187, it is replaced by relatively warm water through the supply pipe 185 and this relatively warm water may tend to stratify and greatly increase the load on the refrigerating apparatus which will result in a relatively large increase in suction pressure. It is found that when water is dispensed through the dispensing valve 187 that the suction pressure rises to 30 pounds to pull in the relay or starter 77 to place the refrigerating apparatus in operation when it is not absolutely necessary that the refrigerating apparatus operate. Accordingly, if the warm water entering through the supply pipe 185 is mixed with the cold water within the tank 184, stratification of the water in the tank 184 is prevented and hence the suction pressure does not rise to 30 pounds to start the refrigerating apparatus until an appreciably great amount of water is withdrawn from the tank 184. It is not desirable to have the circulator 215 operate continuously since this is unnecessary and would greatly increase the operating costs of the fixture. Accordingly, it is within the contemplation of this invention to place the circulator in operation when the suction pressure rises to 25 pounds and to continue the circulator in operation until the suction pressure is again reduced to 22 pounds. It is found that if the circulator is placed in operation when the suction pressure rises to 25 pounds, the suction pressure is invariably prevented from rising to 30 pounds and is in fact reduced to a value corresponding to 22 pounds. Hence the circulator when controlled in this fashion keeps the temperature of the water in the cooling tank 184 within desired limits and prevents unnecessary operation of the refrigerating apparatus upon dispensing small quantities of water.

The circulator 215 is controlled by the relay 29, which in turn is controlled by the auxiliary control means in the unitary control arrangement which is identical to the auxiliary control means described above in connection with Figure 3 and therefore like reference characters for like parts have been utilized. When the suction pressure rises to 25 pounds, contact arm 166 engages contact 163 and contact arm 165 engages contact 162 to complete a starting circuit for the relay coil 115 which may be traced from the secondary 122 through wire 140, contact 163, contact arms 166 and 165, contact 162, wire 141, relay coil 115, and wire 142 back to the secondary 122. Energization of the relay 29 in this manner causes operation of the circulator 215. Energization of the relay 29 also completes a maintaining circuit which may be traced from the secondary 122 through wire 140, contact 163, contact arms 166 and 165, wire 146, switch arm 116, contact 118, wire 147, relay coil 115, and wire 142 back to the secondary 122. This maintaining circuit maintains the circulator in operation until the suction pressure decreases to 22 pounds.

When the cam 55 is adjusted to vary the value of the suction pressure at which the refrigerating apparatus is placed in operation, it simultaneously and similarly varies the value of tne suction pressure at which the circulator 215 is placed in operation so that regardless of the setting of the instrument for controlling the operation of the refrigerating apparatus, the relationship between the pressure values which cause starting of the refrigerating apparatus and starting of the circulator remains fixed.

From the above, it is seen that a novel control arrangement is provided for controlling the operation of a refrigerating apparatus and for controlling the operation of an auxiliary mechanism associated therewith wherein adjustment of the control of the refrigerating apparatus results in like adjustment of the control of the auxiliary apparatus. This control arrangement has wide application as is evidenced by the three modifications shown in this application. Although for purposes of illustration various modifications of this invention have been disclosed, other forms thereof may become apparent to those skilled in the art upon reference to this disclosure, and therefore this invention is to be limited only by the scope of the appended claims and the prior art.

I claim as my invention:

1. In a refrigeration control system, the combination of, a device responsive to changes in the value of a condition indicative of a need for refrigeration and moved in accordance with such changes, a first switch including a movable contact operated by said device and a relatively stationary contact arm to be engaged by the movable contact, a stop for the contact arm, means for biasing the contact arm into engagement with the stop and toward said movable contact whereby the first switch is opened and closed upon movement of said condition responsive device, a second switch including relatively movable contact operating members carrying contacts, means for biasing one of the contact operating members into engagement with the contact arm and the other contact operating member into engagement with the stop whereupon movement of the contact arm with respect to the stop causes opening and closing of the second switch.

2. In a refrigeration control system, the combination of, a device responsive to changes in the value of a condition indicative of a need for refrigeration and moved in accordance with such changes, a first switch including a movable contact operated by said device and a relatively stationary contact arm to be engaged by the movable contact, a stop for the contact arm, means for biasing the contact arm into engagement with the stop and toward said movable contact whereby the first switch is opened and closed upon movement of said condition responsive device, a second switch including relatively movable contact operating members carrying contacts, means for biasing one of the contact operating members into engagement with the contact arm and the other contact operating member into engagement with the stop whereupon movement of the contact arm with respect to the stop causes opening and closing of the second switch, and means for adjusting the stop for similarly and simultaneously adjusting the switching action of both switches with respect to the value of the condition to which said device responds.

3. In a refrigeration control system for a refrigerating apparatus having an evaporator for performing a cooling function and a compressor, the combination of, circulating means for circulating a fluid to be cooled over the evaporator, control means for the circulating means, control means for the compressor, a common means responsive to a condition which is a measure of temperature for operating both control means to control the compressor and the circulating means in accordance with changes in the condition, and means for simultaneously and similarly adjusting both control means.

4. In a refrigeration control system for a refrigerating apparatus having an evaporator for performing a cooling function and a compressor, the combination of, circulating means for circulating a fluid to be cooled over the evaporator, control means for starting and stopping the circulating means, control means for starting and stopping the compressor, a common means responsive to a condition which is a measure of temperature for operating both control means to start and stop the circulating means and the compressor at desired values of the condition, and means for simultaneously adjusting both control means to vary the values of the condition at which the circulating means and the compressor are started and stopped.

5. In a refrigeration control system for a refrigerating apparatus having an evaporator for performing a cooling function and a compressor, the combination of, circulating means for circulating a fluid to be cooled over the evaporator, a device responsive to changes in the value of a condition which is a measure of temperature and moved in accordance with such changes, a first control means operated by said device upon movement thereof for starting and stopping the compressor at desired values of the condition, a second control means operated by said device upon movement thereof for starting and stopping the circulating means at desired values of the condition, the value of the condition at which the second control means is operated bearing a definite relation to the value of the condition at which the first control means is operated, and means for simultaneously and similarly adjusting both control means so that they are operated by the device at other desired values but maintaining the definite relation between the values of the condition that operate the control means substantially constant.

6. In refrigeration control system for a refrigerating apparatus having an evaporator for performing a cooling function and a compressor, the combination of, circulating means for circulating a fluid to be cooled over the evaporator, control means for the circulating means, control means for the compressor, and a common means responsive to a condition which is a measure of evaporator temperature for operating both control means to control the compresser and the circulating means in accordance with changes in the condition, and means for simultaneously and similarly adjusting both control means.

7. In a refrigeration control system for a refrigerating apparatus having an evaporator for performing a cooling function and a compressor, the combination of, circulating means for circulating a fluid to be cooled over the evaporator, control means for the circulating means, control means for the compressor, and a common means responsive to a condition which is a measure of the temperature of the fluid to be cooled by the evaporator for operating both control means to control the compressor and the circulating means in accordance with changes in the condition, and means for simultaneously and similarly adjusting both control means.

8. In a refrigeration control system for a refrigerating apparatus having an evaporator for cooling a fixture or space and a compressor, the combination of, circulating means for circulating fluid of the fixture or space over said evaporator, control means responsive to a condition which is a measure of evaporator temperature for controlling the circulating means and the compressor, and control means responsive to the temperature of the fluid of the fixture or space for also controlling the compressor.

9. In a refrigeration control system for a refrigerating apparatus having an evaporator for cooling a fixture or space and a compressor, the combination of, circulating means for circulating fluid of the fixture or space over said evaporator, control means including means responsive to a condition which is a measure of evaporator temperature and means responsive to the temperature of the fluid of the fixture or space for starting the compressor only when the condition which is a measure of evaporator temperature rises to a predetermined high value and the temperature of the fluid of the fixture rises to a predetermined high value, and means controlled by said means responsive to the condition which is a measure of evaporator temperature for stopping operation of the circulating means when the condition which is a measure of evaporator temperature rises to a predetermined higher value.

10. In a refrigeration control system for a refrigerating apparatus having an evaporator for cooling a space and a compressor, the combination of, circulating means for circulating air of the space over the evaporator, a device movable in response to changes in the temperature of the air in the space, control means for the compressor operated by said device for starting and stopping operation of the compressor at predetermined temperature values, control means for the circulating means operated by said device for starting and stopping operation of the circulating means at predetermined temperature values, and means for simultaneously adjusting both control means to vary the temperature values at which the compressor and the circulating means are started and stopped.

11. In combination, a fixture having a storage compartment and a liquid cooler, evaporator means for the storage compartment and liquid cooler, a circulator for circulating liquid over the evaporator means in the liquid cooler, a refrigerating apparatus including a compressor for supplying and withdrawing refrigerant to and from the evaporator means, means including means responsive to variations in pressure on the low pressure side of the refrigerating apparatus for controlling operation of the compressor, and means responsive to variations in pressure on the low pressure side of the refrigerating apparatus for controlling operation of the circulator.

12. In combination, a fixture having a storage compartment and a liquid cooler, evaporator means for the storage compartment and liquid cooler, a circulator for circulating liquid over the evaporator means in the liquid cooler, a refrigerating apparatus including a compressor for supplying and withdrawing refrigerant to and from the evaporator means, means for controlling the operation of the compressor including means responsive to variations in pressure on the low pressure side of the refrigerating apparatus and means responsive to variations in temperature of the storage compartment, and means responsive to variations in pressure on the low pressure side of the refrigerating apparatus for controlling operation of the circulator.

13. In a refrigeration control system for a refrigerating apparatus having an evaporator for performing a cooling function and a compressor, the combination of, circulating means for circulating a fluid to be cooled over the evaporator, a device responsive to a condition which is a measure of temperature, control means for the compressor operated by the condition responsive device for starting and stopping operation of the compressor, control means for the circulating means operated by the condition responsive device for starting and stopping operation of the circulating means, first means for adjusting the compressor control means to vary the value of the condition at which the compressor is started, second means for adjusting the compressor control means to vary the value of the condition at which the compressor is stopped, and means controlled by the first adjusting means for adjusting the control means of the circulating means to vary the values of the condition at which the circulating means is started and stopped.

14. In a refrigeration control system for a refrigerating apparatus having an evaporator for performing a cooling function and a compressor, the combination of, circulating means for circulating a fluid to be cooled over the evaporator, a device responsive to a condition which is a measure of temperature, control means for the compressor operated by the condition responsive device for starting and stopping operation of the compressor, control means for the circulating means operated by the condition responsive device for starting and stopping operation of the circulating means, first means for adjusting the compressor control means to vary the value of the condition at which the compressor is started, second means for adjusting the compressor control means to vary the value of the condition at which the compressor is stopped, and means controlled by the second adjusting means for adjusting the control means of the circulating means to vary the values of the condition at which the circulating means is started and stopped.

ALWIN B. NEWTON.